July 18, 1950 A. L. PRESTON 2,515,835
FLUID SUPPLY SYSTEM
Filed April 11, 1945
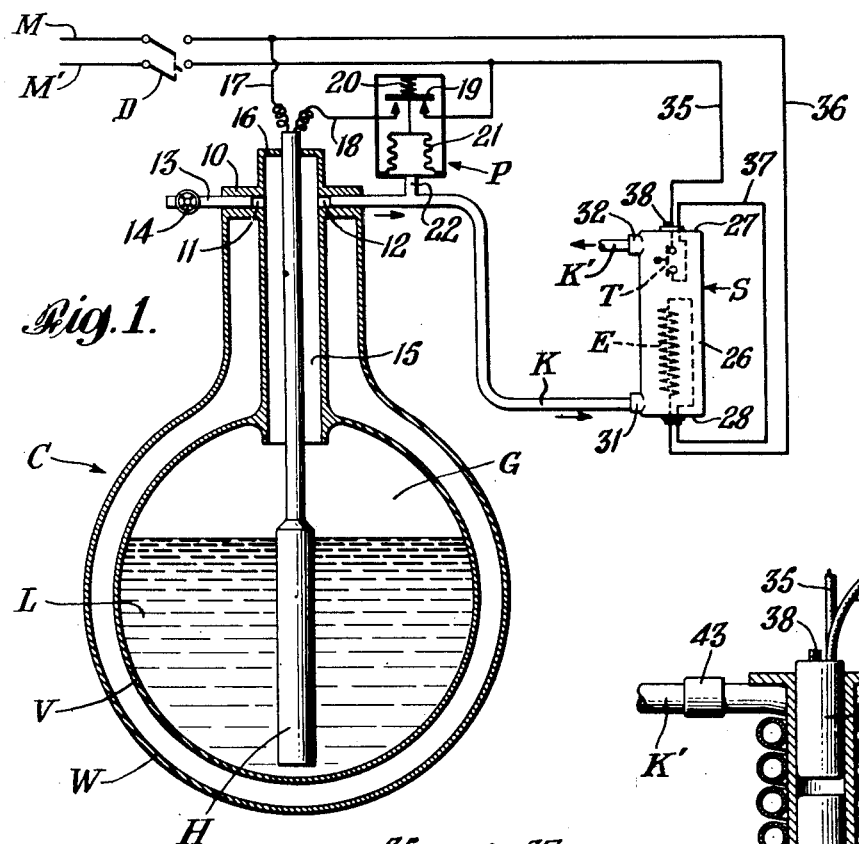
Fig. 1.
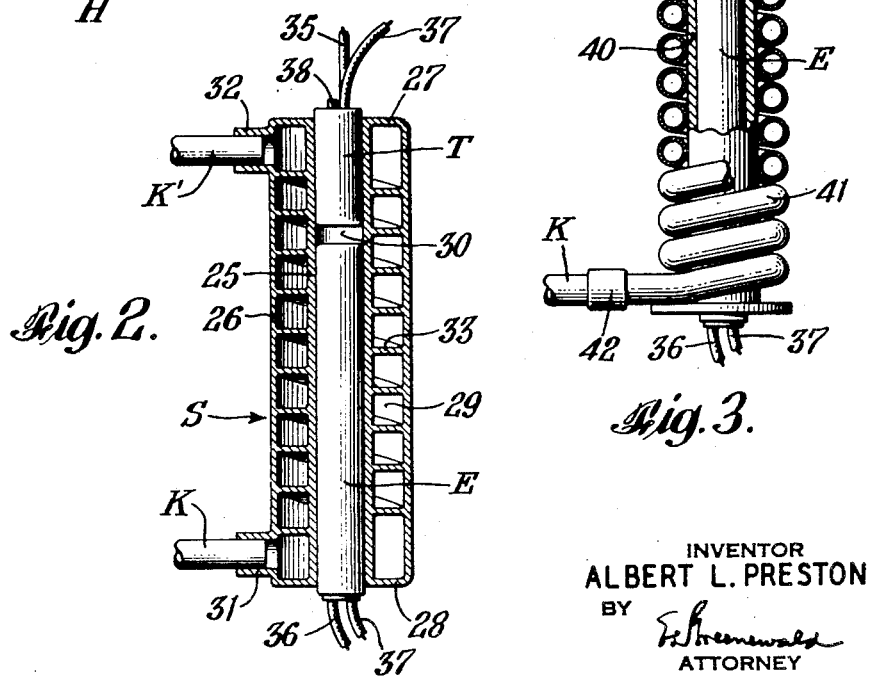
Fig. 2.
Fig. 3.
INVENTOR
ALBERT L. PRESTON
BY
*E. Greenewald*
ATTORNEY Patented July 18, 1950

2,515,835

UNITED STATES PATENT OFFICE 2,515,835

FLUID SUPPLY SYSTEM

Albert L. Preston, Kenmore, N. Y., assignor to The Linde Air Products Company, a corporation of Ohio Application April 11, 1945, Serial No. 587,655

9 Claims. (Cl. 62—1)

This invention relates to fluid supply systems, and more particularly to an improved system and equipment for supplying oxygen under pressure and at a suitable temperature to the occupants of aircraft or to persons to whom gaseous oxygen is administered.

It is well known that in high altitude flying it is necessary to furnish additional oxygen for breathing to persons aboard aircraft, and it has been proposed to accomplish this by carrying in the aircraft a supply of liquid oxygen to be vaporized and distributed as a gas to such persons when needed. In some service conditions, as when the liquid oxygen container is tilted or inverted, liquid oxygen may enter the dispensing conduit leading from the container or droplets of liquid oxygen may be entrained with the vaporized oxygen into the said conduit. The delivery of any liquid oxygen to breathing equipment would be decidedly objectionable. Moreover, the oxygen as vaporized usually is too cold and uncomfortable for breathing purposes, and it therefore is desirable to heat such oxygen and maintain it at a suitable temperature for breathing.

Accordingly, the principal objects of this invention are to provide a system and equipment for warming or superheating the oxygen, in either a liquid or a gaseous state, which flows from the liquid oxygen container and before the oxygen reaches its point of use, so that only gaseous oxygen at a suitable temperature and pressure will be supplied to the consumer; and to provide a control system for automatically regulating both the vaporizer and the superheater of the oxygen supply equipment, to deliver oxygen gas as needed and at the desired temperature and pressure.

Further objects are: to provide an improved fluid superheater which will maintain the superheated vapor discharging therefrom at a desired temperature; and particularly, to provide an electrical superheater in which an electric heating unit and a thermally-operable control unit therefor are both disposed outside but in heat-conductive relation with the fluid conduit of the heater, and in which the heating unit and the control unit also are in heat-conductive relation with one another, thereby to automatically maintain the discharging fluid at a desired temperature and prevent burning out the electric heating unit.

The above and other objects and the novel features of this invention will become apparent from the following description and the accompanying drawings, in which:

Fig. 1 is a view which diagrammatically illustrates the principles and novel features of this invention as embodied in apparatus for delivering gaseous oxygen under pressure from a supply of liquid oxygen;

Fig. 2 illustrates a novel combination heater and control unit which is an element of the gas supply system illustrated in Fig. 1; and Fig. 3 is a view, partly sectional, illustrating an alternative construction of the unit shown in Fig. 2.

An improved oxygen gas supply system embodying this invention includes a container C confining a supply of liquid oxygen L which may be vaporized by a heater H to provide oxygen gas under the pressure and as demanded by the oxygen-consuming means, e. g., the occupant of an airplane that carries the vessel containing the liquid oxygen. The vaporizing means H may be automatically controlled by a pressure-actuated switch P and, to guard against accidental delivery of liquid oxygen through conduit sections K, K' to the consuming means and to insure that the oxygen gas to be consumed shall have a comfortable or desired temperature, an automatically controlled superheater S, which is compact and preferably of light weight, is connected between conduit sections K, K' and has a passage therethrough which constitutes a part of the oxygen gas delivery conduit. The superheater S may include an electric heater E arranged to be controlled by a thermally-actuated switch T.

The liquefied gas holding container may be of more or less conventional construction for stationary use or for portable and aircraft use, the container may be constructed as described in the United States application Serial No. 587,656 of A. L. Preston and G. H. Zenner. For the purpose of clearly describing the present invention, a simplified form of liquid oxygen container is illustrated and described herein.

As illustrated in Fig. 1, the liquid oxygen container C is a portable double-walled structure of the necked type comprising an inner vessel V and an outer wall W. The vessel V and wall W are spaced apart and the intervening space is evacuated, filled with thermal insulation, or both, to reduce heat leak from the outside to the body of liquid oxygen L in the vessel V. The necks of the vessel V and wall W may be integrally joined together adjacent their mouths by a collar 10, which latter is provided with suitable inlet and outlet passages 11 and 12, respectively, both opening into the interior of the neck of vessel V. A suitable filling pipe 13, controlled by a valve 14, is connected to the passage 11 to replenish the supply of liquid oxygen in the vessel V. A full charge of liquid oxygen desirably only partly fills the vessel V, so that a gas space or chamber G will be left above the level of the liquid L to initially receive the vaporized gas. The chamber G may communicate with the outlet passage 12 by way of a passage 15 through the neck of the vessel V.

Suitable means may be utilized to vaporize the liquid oxygen L and to build up and maintain the desired oxygen gas pressure in the chamber G. As shown, a conventional immersion type electric resistance heater H is suspended from the neck closure 16 so that its heating element will be disposed within the liquid oxygen L to vaporize the latter as oxygen gas is withdrawn from the vessel V. The heater H may be suitably controlled by energizing and de-energizing its heating element in response to variations of the oxygen gas pressure in the vessel V. This is preferably accomplished by an electric switch P which controls the flow of electric heating current through the lead wires 17 and 18 in series circuit with the resistance heating element of the heater H. The switch P includes a contactor 19 which is normally held in circuit-closing position by a spring 20 and is movable to circuit-opening position by a bellows 21. The interior of the bellows 21 communicates through a branch pipe 22 with the oxygen gas delivery conduit section K that is connected to the outlet 12 of the vessel V. The pressure-opening switch P may be adjusted to operate automatically at a predetermined pressure of the oxygen gas in the vessel V, to open the switch and de-energize the heater H. Conversely, the switch will be closed automatically by the spring 20 when the oxygen gas pressure in vessel V falls to a predetermined value, thereby energizing the heater H and vaporizing more liquid oxygen.

For the purpose of vaporizing any liquid oxygen which may flow or be carried into the delivery conduit section K, and to additionally heat the vaporized oxygen before it reaches the user, the superheater S is connected to the conduit sections K and K' to form a part of the complete delivery conduit and to heat the fluid passing therethrough. As shown in Fig. 2, the superheater S may include two concentric cylindrical walls 25 and 26 of metal or other suitable heat-conductive material joined together by annular end walls 27 and 28 and spaced apart intermediate said end walls to provide a fluid conduit section or heating chamber 29. The inner wall 25 provides a cylindrical chamber 30 open at its opposite ends to receive and tightly fit a metal-encased electric resistance heating unit E and a metal-encased thermally-actuated electric switch T. A suitable type of switch is one disclosed in U. S. Patent No. 2,257,990 of W. J. Turenne. The heating unit and the switch are removable from the chamber 30, and the switch T desirably has its inner end spaced from the inner end of the heating unit E. The opposite ends of the outer wall 26 have nipples 31 and 32 which open into the chamber 29 and serve to connect the latter as a section in series with sections K and K' of the delivery conduit. Either nipple 31 or nipple 32 may be the inlet of the chamber 29 while either nipple 32 or nipple 31 may be the outlet of this chamber. A helically extending metal partition 33 preferably is united to the opposed surfaces of the inner and outer metal walls 25 and 26 between the nipples 31 and 32, to provide a helical path for the fluid passing through the heating chamber 29 and to increase the rate of heat transfer from the heating unit E to the fluid within the chamber 29.

The thermally-conductive casing of the heating unit E desirably is sufficiently long to contact the major portion of the inner surface of the wall 25, and at least a portion of the unit E desirably is located opposite the nipple through which the fluid enters the heating chamber 29. The heating unit E and the thermal switch T are electrically connected in series circuit with the current supply mains M, M'; leads 35 and 36 respectively connecting one terminal of the switch T and one terminal of the unit E to said mains, and a lead 37 electrically connecting the other terminals of the unit E and the switch T directly with one another. Means, such as a screw 38, desirably is provided to manually adjust the position of a part of the switch T and thereby set the latter to open and close the circuit of the heating unit E at the desired temperatures.

A suitable manually-operable switch D may be provided to electrically connect, or disconnect, a suitable source of electric current to the service mains M, M'.

In operation, cold oxygen gas and any liquid oxygen discharged from the container C flows through the conduit section K and nipple 31 into the helical heating chamber 29 and is discharged from the latter through the nipple 32 into the conduit section K', which latter delivers the warmed oxygen gas to the consuming means. As the oxygen flows through the chamber 29, it is heated to the desired temperature, e. g., between 30° F. and 36° F. by conduction, convection and radiation of heat from the metal elements of the superheater S.

To maintain the oxygen delivered from the superheater S between 30° F. and 36° F., the thermal switch T is adjusted to close the circuit when the temperature of the wall 25 falls below 35° F. and to open the circuit when the temperature of the wall 25 exceeds 36° F. Due to the temperature difference which is required to effect heat exchange between a metal wall and a flowing gas, which temperature difference increases as the rate of gas flow increases, the oxygen will be heated to a temperature usually below that of the metal wall 25. The superheater S is therefore so proportioned that when the desired maximum rate of discharge of oxygen from the container C occurs, the oxygen passing through the superheater S will be heated to the desired temperature, which according to the example above specified, will be above 30° F. when the temperature of the inner wall 25 is between 35° and 36° F.

Because of the low thermal resistance of the metallic path between the heater E and the switch T, the temperature of the inner wall 25 of the superheater S and the temperature of the switch T will become very nearly the same as the temperature of the heater E. When the heater E has raised the temperature of the inner wall 25 to the desired maximum temperature, e. g., 36° F., the switch T will open the electrical circuit and the heater E will become deenergized. When the cold oxygen that is being warmed lowers the temperature of the inner wall 25 to the selected minimum temperature, e. g., 35° F., the switch T will close and the heater E will become energized. Because the metal elements of the superheater S are of good thermal conductivity, the temperature of both the helical partition 33 and the outer wall 26 will be only slightly lower than the temperature of the inner wall 25.

The flow of oxygen from the container C through the chamber 29 to the consuming means may cease or be interrupted, as when there is no demand for oxygen gas, or the supply of liquid oxygen becomes exhausted, or the heater H or the switch P becomes disabled. In the event that the oxygen flow ceases for any reason, the temperature of the inner wall 25 rises to say 36° F., whereupon the switch T will be actuated to open the electrical circuit of the heater E, so that the latter becomes de-energized, and over-heating and burning out of the heater E will be prevented. When the flow of oxygen through the delivery conduit is started again, the heater E will become energized as soon as the switch T is automatically closed by the fall of the temperature of the inner wall 25 to say 35° F.

It will be evident that the thermally-actuated switch T automatically performs two distinct functions: (1) it causes the heater E to be energized and de-energized, to maintain at a desired temperature the oxygen gas that is discharged from the chamber 29; and (2) it causes the heater E to be de-energized when the flow of oxygen through the chamber 29 is interrupted or ceases, thereby preventing the heater from overheating and burning out.

Both the heater E and the switch T preferably are arranged outside of the heating chamber 29, so that neither the heater E nor the switch T is directly in contact with the fluid being heated. This feature eliminates such problems as pressure-tight joints around the heater and the switch, or around the current leads to the heater and to the switch. This construction is especially advantageous in a superheater for heating fluids under high pressure and corrosive fluids, where it usually has been necessary heretofore to provide specially designed heaters and switches to directly heat such fluids and to control the discharge temperature thereof.

The walls and elements of the heating chamber 29 of the superheater, as used for heating oxygen, may consist of metal of relatively high thermal conductivity. It will be understood however that the novel features of the improved superheater are also applicable to a construction wherein the walls and other elements of the heating chamber 29 consist of material of low thermal conductivity, such as corrosion-resistant metal constructed to provide a conduit chamber for heating a corrosive fluid. For this construction, a suitable or better thermal path of low resistance may be provided between the heater E and the switch T, to protect the heater E from overheating and burning out when the flow of fluid through the chamber 29 is interrupted.

This may be accomplished as illustrated for example in Fig. 3 by providing a metal member or tube 40 having relatively low thermal resistance into which the heater E extends more than half way. The thermally actuated switch T extends into the tube 40 from the other end and is preferably spaced from said heater. A conduit means of suitable form for example a coiled tube 41 is in contact with the outer wall of the tube 40 and is preferably helically wound thereon. Couplings 42 and 43 at the ends of the tube 41 are provided for connection to the conduit portion K and K'. The tube 41 should be in good thermal contact with the tube 40 which thermal contact can be increased by suitable means such as soldering or brazing. The conduit means or tube 41 can thus be made of a material selected for its corrosion resistance while the tube 40 is made of material having particularly good heat conductivity. The tubular form also provides high pressure resistance, in the event that the fluid to be heated is under high pressure.

In a construction such as that of Fig. 3, the temperature of the heater E and that of the metal member or tube 40 must be maintained at a slightly higher value than the temperature of the heater E and of the wall 25 in the superheater shown in Fig. 2 in order to overcome the thermal resistance of the additional thickness of material between the fluid passage and the heater E.

It will be understood that numerous details of the fluid delivery system and the superheater disclosed herein may be changed, to suit different applications, without departing from the principles of this invention.

What is claimed is:

1. In a system for supplying gaseous oxygen at a desired temperature and pressure generated from liquid oxygen, in combination, a container for a body of liquid oxygen; a first heating means operative to heat and vaporize liquid within said container; means automatically operable to control said first heating means in response to the pressure of such vaporized gas; a delivery conduit connected to said container to convey the vaporized gas to a consuming means; a second heating means operative to heat gas flowing through said conduit; and means automatically operable to control said second heating means in response to the temperature of the gas flowing through said conduit and operable to render said second heating means inoperative when the flow of gas from said container through said conduit ceases.

2. In a system for supplying gaseous oxygen at a desired temperature and pressure generated from liquid oxygen, in combination, a container for a supply of liquid oxygen; a first electric resistance heater within said container for heating and vaporizing said liquid; a delivery conduit connected to said container to convey vaporized gas therefrom to a consuming means; an electric switch controlling the supply of current to said first heater; means automatically operating said first switch in response to variations of the pressure of such vaporized gas; a second electric resistance heater operative to heat the gas flowing through said conduit; and a thermally-actuated electric switch controlling the supply of current to said second heater and actuated in response to variations of the temperature of the gas flowing through said conduit and also operable to de-energize said second heater when the flow of gas from said container through said conduit ceases.

3. A fluid superheater comprising, in combination, a fluid conduit having a thermally conductive wall of low thermal resistance; an electrically-energizable heating means for heating the fluid within said conduit, said heating means having a part thereof in contact with said wall; and a thermally-actuated electric switch in circuit with said heating means and operable in response to the temperature of the fluid within said conduit to control the energization of said heating means, said switch also having a part thereof in contact with said wall, whereby said wall provides a path of low thermal resistance between said heating means and said switch to actuate the latter and interrupt the energization of said heating means when the flow of fluid through said conduit ceases.

4. A fluid superheater comprising, in combination, a fluid conduit disposed between inner and outer walls, such inner wall comprising thermally-conductive material and providing a chamber having two openings; heating means extending into said chamber through one of said openings and operable to heat said inner wall and the fluid within said conduit; and control means extending into said chamber through the other of said openings and thermally associated with said inner wall, said control means being spaced from said heating means and operatively connected to said heating means to render the latter operative and inoperative, respectively, in response to selected low and high temperatures of the fluid within said conduit and to heat conducted through said inner wall from said heating means.

5. A fluid superheater as claimed in claim 4, wherein said inner and outer walls are tubular and concentric, and a helical partition is united to the opposed surfaces of said walls to form a helical conduit for the fluid to be heated.

6. A fluid superheater comprising, in combination, a fluid conduit having concentric inner and outer thermally-conductive tubular walls, such inner wall providing a chamber open at its opposite ends; an electrically-energizable heating means within said chamber adjacent one end thereof and operable to heat said inner wall and the fluid within said conduit; and a thermally-actuated switch within said chamber adjacent the other end thereof and spaced from said heating means, said switch being thermally associated with said inner wall and electrically controlling the current supply circuit of said heating means to energize and de-energize said heating means in response to selected low and high temperatures, respectively, of the fluid within said conduit and in response to heat conducted through said inner wall from said heating means.

7. A fluid superheater as claimed in claim 6, wherein said heating means and said switch are spaced apart at their inner ends and said inner wall provides at least a portion of a path of low thermal resistance between said heating means and said switch to render the latter operative to de-energize said heating means when the flow of fluid through said conduit ceases.

8. A fluid superheater comprising, in combination, a fluid conduit having concentric inner and outer tubular metal walls, such inner wall providing a chamber open at its opposite ends; an electrically-energizable heating means removably secured in one end of said chamber and operable to heat said inner wall and fluid flowing through said conduit; and a thermally-actuated switch electrically in circuit with said heating means and removably secured in the other end of said chamber in heat transfer relation with said inner wall and the fluid flowing through said conduit, said switch being spaced from said heating means and being operable to energize and de-energize said heating means in response to selected low and high temperatures, respectively, of the fluid in said conduit and also being operable, by heat transmitted directly thereto from said heating means through said inner wall, to de-energize said heating means when the flow of fluid through said conduit ceases.

9. A fluid superheater comprising, in combination, a fluid conduit having a wall of corrosion resistant material having substantial thermal resistance; an electrically-energizable heating means operable to transfer heat through said wall to heat fluid flowing through said conduit; a thermally-actuated electric switch thermally associated with the outside of said wall and operable to energize and de-energize said heating means in response to the temperature of the fluid in said conduit; and means providing a path of low thermal resistance between said heating means and said switch to render the latter operable to de-energize said heating means when the flow of fluid through said conduit ceases.

ALBERT L. PRESTON.

REFERENCES CITED

The following references are of record in the file of this patent:

UNITED STATES PATENTS

| Number | Name | Date |
|---|---|---|
| 1,715,687 | Vaughan | June 4, 1929 |
| 1,724,767 | Mercer | Aug. 13, 1929 |
| 1,837,000 | Wertz | Dec. 15, 1931 |
| 1,859,442 | Henderson | May 24, 1932 |
| 1,888,400 | Vernet | Nov. 22, 1932 |
| 2,104,940 | Woolery | Jan. 11, 1938 |
| 2,106,756 | Obermaier | Feb. 1, 1938 |
| 2,145,287 | Beyrodt | Jan. 31, 1939 |
| 2,158,458 | Mathis et al. | May 16, 1939 |
| 2,201,703 | Sage | May 21, 1940 |
| 2,247,816 | McIlrath | July 1, 1941 |
| 2,260,357 | Zenner | Oct. 28, 1941 |
| 2,288,248 | Long | June 30, 1942 |
| 2,401,651 | Mathis et al. | June 4, 1946 |
| 2,432,169 | Morgan et al. | Dec. 9, 1947 |
| 2,433,744 | Dieterle | Dec. 30, 1947 |